United States Patent
Warner et al.

(10) Patent No.: US 10,883,519 B2
(45) Date of Patent: Jan. 5, 2021

(54) COMPRESSOR STAKING ARRANGEMENT

(71) Applicant: Emerson Climate Technologies, Inc., Sidney, OH (US)

(72) Inventors: Jason M. Warner, Arcanum, OH (US); Gregg M. Hemmelgarn, Yorkshire, OH (US); Kyle M. Bergman, Yorkshire, OH (US); Glenn D. Deland, Sidney, OH (US); Walter T. Grassbaugh, Sidney, OH (US); James A. Schaefer, Troy, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 255 days.

(21) Appl. No.: 15/971,678

(22) Filed: May 4, 2018

(65) Prior Publication Data

US 2018/0252234 A1 Sep. 6, 2018

Related U.S. Application Data (62) Division of application No. 13/863,744, filed on Apr. 16, 2013, now Pat. No. 9,964,122.
(Continued)

(51) Int. Cl.
*F04D 29/60* (2006.01)
*B23P 15/00* (2006.01)
(Continued)

(52) U.S. Cl.
CPC .......... *F04D 29/601* (2013.01); *B23P 11/005* (2013.01); *B23P 15/003* (2013.01);
(Continued)

(58) Field of Classification Search
CPC ......... B23P 11/005; B23P 15/003; F04C 2/00; F04C 18/0215; F04C 23/008;
(Continued)

(56) References Cited

U.S. PATENT DOCUMENTS 4,763,397 A * 8/1988 Tsukayama ............ B21D 39/00
264/249
4,792,296 A * 12/1988 Kobayashi ............ F04C 29/023
418/55.6

(Continued)

FOREIGN PATENT DOCUMENTS

| CN | 1105423 A | 7/1995 |
| CN | 1509379 A | 6/2004 |

(Continued)

OTHER PUBLICATIONS

Office Action regarding Chinese Patent Application No. 201310156637. 5, dated Apr. 16, 2015. Translation provided by Unitalen Attorneys at Law.
(Continued)

*Primary Examiner* — Patrick Hamo
*Assistant Examiner* — Paul W Thiede
(74) *Attorney, Agent, or Firm* — Harness, Dickey & Pierce, P.L.C.

(57) ABSTRACT

A compressor is provided and may include a shell and a stator. The shell includes an inner surface and an outer surface. The stator may be attached to the shell at the inner surface via a first stake. The first stake may be formed by deforming a portion of the shell into the stator.

20 Claims, 8 Drawing Sheets

Related U.S. Application Data (60) Provisional application No. 61/640,082, filed on Apr. 30, 2012.

(51) Int. Cl.
*F04C 2/00* (2006.01)
*B23P 11/00* (2006.01)
*F04C 18/02* (2006.01)
*F04C 23/00* (2006.01)
*F01C 1/08* (2006.01)

(52) U.S. Cl.
CPC .................. *F04C 2/00* (2013.01); *F01C 1/08* (2013.01); *F04C 18/0215* (2013.01); *F04C 23/008* (2013.01); *F04C 2230/00* (2013.01); *F04C 2240/80* (2013.01); *Y10T 29/49245* (2015.01)

(58) Field of Classification Search
CPC .............. F04C 2230/00; F04C 2240/80; F04D 29/601; F04D 29/056; F04D 29/053; F04D 29/602; F04D 29/624; Y10T 29/49245; F05B 2230/60; F04B 2240/50; F04B 2240/54; F01C 1/08
USPC ........... 415/229; 417/410.1, 410.5; 418/55.2, 418/55.3, 55.4, 55.5, 55.1–55.6
See application file for complete search history.

(56) References Cited

U.S. PATENT DOCUMENTS

| | | | |
|---|---|---|---|
| 5,267,844 A * | 12/1993 | Grassbaugh | F04B 39/121 417/410.5 |
| 5,947,709 A | 9/1999 | Koyama et al. | |
| 7,363,696 B2 | 4/2008 | Kimura et al. | |
| 8,215,926 B2 | 7/2012 | Fields et al. | |
| 8,328,534 B2 | 12/2012 | Zamudio et al. | |
| 2008/0170957 A1 | 7/2008 | Hwang et al. | |
| 2009/0277939 A1 | 11/2009 | Ou | |
| 2011/0135517 A1 | 6/2011 | Zamudio et al. | |

FOREIGN PATENT DOCUMENTS

| | | |
|---|---|---|
| CN | 1916420 A | 2/2007 |
| CN | 1955482 A | 5/2007 |
| CN | 102062096 A | 5/2011 |
| CN | 202040082 U | 11/2011 |
| CN | 202117931 U | 1/2012 |
| CN | 203463289 U | 3/2014 |
| JP | H09-158862 A | 6/1997 |
| KR | 100547319 B1 | 1/2006 |

OTHER PUBLICATIONS

Office Action regarding Chinese Patent Application No. 201310156637.5, dated Dec. 18, 2015. Translation provided by Unitalen Attorneys at Law.

Office Action regarding Chinese Patent Application No. 201310156637.5, dated Jun. 3, 2016. Translation provided by Unitalen Attorneys at Law.

Restriction Requirement regarding U.S. Appl. No. 13/863,744, dated Nov. 30, 2016.

Office Action regarding U.S. Appl. No. 13/863,744, dated Feb. 8, 2017.

Office Action regarding U.S. Appl. No. 13/863,744, dated May 17, 2017.

Office Action regarding U.S. Appl. No. 13/863,744, dated Aug. 16, 2017.

* cited by examiner

COMPRESSOR STAKING ARRANGEMENT

CROSS-REFERENCE TO RELATED APPLICATIONS

This application is a divisional of U.S. patent application Ser. No. 13/863,744, filed on Apr. 16, 2013, which claims the benefit of U.S. Provisional Application No. 61/640,082, filed on Apr. 30, 2012. The entire disclosures of the above applications are incorporated herein by reference.

FIELD

The present disclosure relates to compressors and more particularly to a compressor including at least one of a bearing housing and a stator that are staked to a shell of the compressor.

BACKGROUND

This section provides background information related to the present disclosure which is not necessarily prior art.

Compressors may be used in a wide variety of applications to increase the pressure of a working fluid. For example, compressors may be incorporated into an industrial or residential refrigeration, heat pump, HVAC, or chiller system to provide a desired heating or cooling effect by circulating the working fluid amongst the various components of each system. Such compressors typically include a motor that selectively drives a compression mechanism to increase the pressure of the working fluid, thereby causing the working fluid to circulate within the particular system.

The compression mechanism and motor are typically disposed within a shell of the compressor and are positioned relative to one another to allow the motor to drive the compression mechanism during use. A drive shaft typically extends between the motor and the compression mechanism and transmits a rotational force generated by the motor to the compression mechanism. Proper alignment of the motor, the drive shaft, and the compression mechanism is required to permit each component to function properly and to prevent damage to and/or unnecessary wear on the various components.

A bearing housing may be retained within and positioned relative to the shell by press-fitting the bearing housing into the shell. The motor may also be attached to the shell by press-fitting a stator of the motor into the shell or by attaching the stator to a fixture disposed within the shell to properly position the motor within and relative to the shell. Once the position of the bearing housing and the position of the stator are fixed relative to the shell, the relative position between the bearing housing and the motor is likewise fixed. Because the bearing housing rotatably supports the compression mechanism within the shell, fixing a position of the bearing housing relative to the motor likewise fixes a position of the compression mechanism relative to the motor, which allows the motor to properly engage and drive the compression mechanism—via the drive shaft—during use.

While conventional compressors adequately retain and position a bearing housing and a motor within a compressor shell, such compressors are often difficult to manufacture. Namely, establishing the proper position of the bearing housing and/or the stator relative to a compressor shell during manufacturing is often difficult and typically requires use of numerous fixtures to hold the various components prior to the components being assembled to the shell. As such, attaching the bearing housing and the stator to the compressor shell in a conventional manner adds to the overall complexity and cost of manufacturing the compressor and, as a result, adds to the overall cost of the compressor.

SUMMARY

This section provides a general summary of the disclosure, and is not a comprehensive disclosure of its full scope or all of its features.

A compressor is provided and may include a shell having an inner surface and an outer surface and a bearing housing disposed within the shell and having an engagement surface opposing the inner surface. The engagement surface may include a first channel formed substantially perpendicular to a longitudinal axis of the shell and a second channel formed substantially parallel to the longitudinal axis of the shell and in communication with the first channel. The first channel and the second channel may receive a deformed portion of the shell therein to fix a position of the bearing housing relative to the shell.

In another configuration, a compressor is provided and may include a shell having an inner surface and an outer surface and a stator attached to the shell at the inner surface via a first stake. The first stake may be formed by deforming a portion of the shell into the stator.

A method is provided and may include positioning a bearing housing in a compressor shell, contacting an outer surface of the shell with a punch, and deforming a portion of the shell to cause material from the shell to simultaneously flow into a first groove and into a second groove formed in the bearing housing.

A method is provided and may include positioning a bearing housing in a compressor shell, contacting an outer surface of the shell with a punch, and deforming a portion of the shell to cause material from the shell to simultaneously flow into the bearing housing in a first direction and in a second direction different than the first direction A method is provided and may include positioning a bearing housing in a compressor shell, contacting an outer surface of the shell with a punch, and deforming a portion of the shell to cause material from the shell to simultaneously flow into the bearing housing in a first direction and in a second direction to form a substantially T-shaped stake that fixes a position of the bearing housing relative to the shell.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the figures, a compressor 10 is provided and may include a shell 12, a compression mechanism 14, a motor 16, and a drive shaft 18. The drive shaft 18 may extend generally between the compression mechanism 14 and the motor 16 to transmit a rotational force generated by the motor 16 to the compression mechanism 14. In so doing, the drive shaft 18 permits the motor 16 to drive the compression mechanism 14 to compress a fluid received at a suction inlet 20 of the compressor 10. Once the compression mechanism 14 compresses the fluid received at the suction inlet 20 to a discharge pressure, the discharge-pressure fluid may be discharged from the shell 12 via a discharge port 22.

The shell 12 may include a cylindrical, central body 24 extending between a top cap 26 and a bottom cap 28. The central body 24, top cap 26, and bottom cap 28 may cooperate to define an inner volume 30 that receives the compression mechanism 14, the motor 16, and the drive shaft 18 therein. The central body 24 may additionally include an outer surface 32 and an inner surface 34 formed on an opposite side of the central body 24 than the outer surface 32.

The compression mechanism 14 may be disposed within the inner volume 30 of the shell 12 and may include an orbiting scroll member 36, a non-orbiting scroll member 38, and a series of pockets 40 (FIG. 2) defined between the orbiting scroll member 36 and the non-orbiting scroll member 38. The orbiting scroll member 36 may be driven by the drive shaft 18 and may orbit relative to the non-orbiting scroll member 38 due to interaction between the orbiting scroll member 36 and an Oldham coupling 39. Such movement of the orbiting scroll member 36 draws fluid into the inner volume 30 of the shell 12 at the suction inlet 20 and compresses the fluid within the pockets 40 formed between the orbiting scroll member 36 and the non-orbiting scroll member 38. Once the fluid is compressed within the pockets 40, the discharge-pressure fluid may be discharged through a muffler plate 42 prior to being discharged from the shell 12 at the discharge port 22.

The orbiting scroll member 36 may be rotatably supported within the inner volume 30 of the shell 12 by a bearing housing 44. The bearing housing 44 may include a plurality of arms 46 and a hub 48. While the bearing housing 44 could include virtually any number of arms 46, the bearing housing 44 will be described and shown hereinafter as including three (3) arms 46.

Each of the arms 46 may extend from the hub 48 in a direction toward the inner surface 34 of the central body 24. Each arm 46 may include a support rib 45 (FIG. 10), a support surface 50 formed on an opposite side of each arm 46 from the support rib 45, an attachment aperture 52, and an engagement surface 54. The support surface 50 may be formed substantially perpendicular to the engagement surface 54 and may receive a portion of the non-orbiting scroll member 38 or, alternatively, a structure supporting the non-orbiting scroll member 38, to position the non-orbiting scroll member 38 relative to the bearing housing 44. The position of the non-orbiting scroll member 38 may be fixed relative to the bearing housing 44 by inserting a fastener 56 through the non-orbiting scroll member 38 or, alternatively, through a structure supporting the non-orbiting scroll member 38 and into the attachment aperture 52 of each arm 46. Attaching the non-orbiting scroll member 38 to each arm 46 via the fastener 56 fixes a radial position of the non-orbiting scroll member 38 relative to the bearing housing 44. In one configuration, the fastener 56 may be received by the non-orbiting scroll member 38 to radially position the non-orbiting scroll member 38 relative to the bearing housing 44 while concurrently permitting axial movement of the non-orbiting scroll member 38 toward and away from the orbiting scroll member 36 along a longitudinal axis 58 of the shell 12.

The engagement surface 54 may include an arcuate shape having the same or similar radius as the inner surface 34 of the central body 24. As such, when the bearing housing 44 is positioned within the central body 24, the engagement surface 54 may be positioned relative to the inner surface 34 of the central body 24 such that substantially the entire engagement surface 54 is in contact with the inner surface 34. While the engagement surface 54 is described as being in contact with the inner surface 34, the engagement surface 54 could alternatively be positioned relative to the inner surface 34 such that the engagement surface 54 is spaced apart from the inner surface 34 to substantially the same extent across the entire engagement surface 54.

Figure 4:
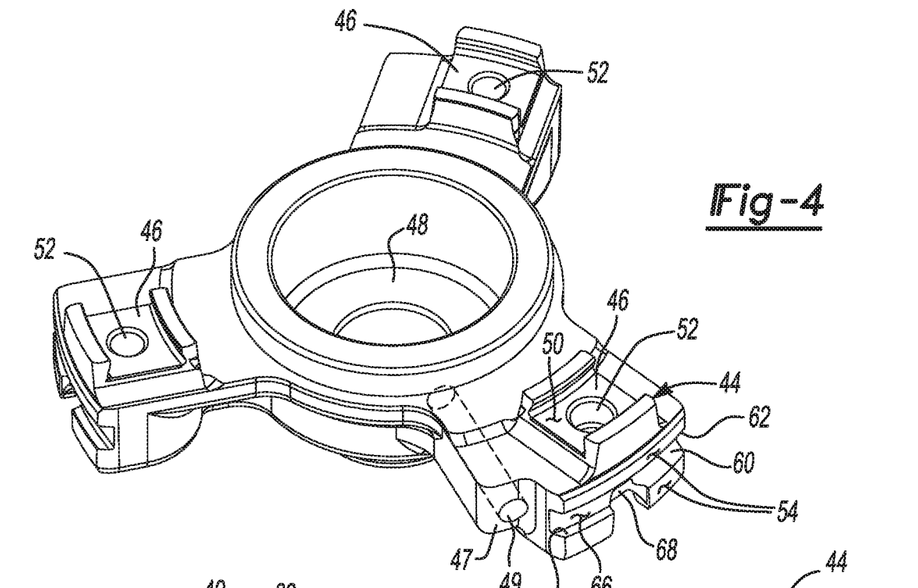
FIG. 4 is a perspective view of a bearing housing of the compressor of FIG. 1.
Figure 5:
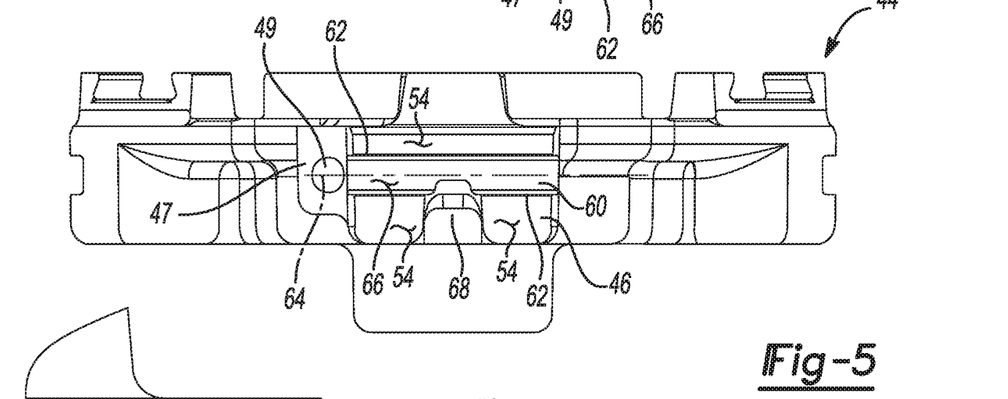
FIG. 5 is a side view of the bearing housing of FIG. 4.
Figure 6:
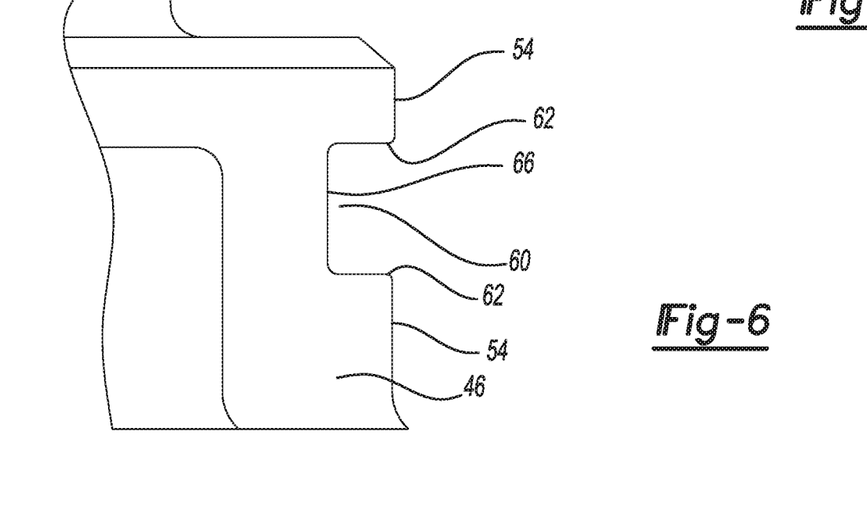
FIG. 6 is a side view of the bearing housing of FIG. 4.

With particular reference to FIGS. 4-6, the arms 46 are shown as including a first channel 60 formed into each arm 46 at the engagement surface 54. The first channel 60 may be formed into each arm 46 and may be recessed from the engagement surface 54 along a length of the engagement surface 54. As such, a junction between the engagement surface 54 and the first channel 60 may define edges 62 that extend along a length of the first channel 60. Each of the edges 62 may be disposed at a junction of the engagement surface 54 and the first channel 60 and may be substantially parallel to a longitudinal axis 64 of the first channel 60. In one configuration, the longitudinal axis 64 and, thus, the edges 62, may be substantially perpendicular to the longitudinal axis 58.

While the first channel 60 will be described and shown hereinafter as being formed in each arm 46, only two of the arms 46 could include a first channel 60. Further, while the first channel 60 is described and shown as including a longitudinal axis 64 that is substantially perpendicular to the longitudinal axis 58 of the shell 12, the first channel 60 could be formed at any angle relative to the longitudinal axis 58.

The first channel 60 may additionally include an engagement surface 66 that opposes the inner surface 34 of the central body 24 and extends along the longitudinal axis 64 of the first channel 60. The engagement surface 66 may be substantially parallel to the engagement surface 54 and may include a similar or smaller radius as the inner surface 34 of the central body 24 such that the engagement surface 66 is spaced apart and separated from the inner surface 34 the same distance along substantially the entire length of the engagement surface 66.

A second channel 68 may be formed into each arm 46 at the engagement surface 54. The second channel 68 may be substantially perpendicular to the first channel 60 and may be formed into each arm 46 such that the second channel 68 extends into and is in communication with the first channel 60. The second channel 68 may extend into the first channel 60 at approximately a midpoint of the first channel 60 such that the first channel 60 and the second channel 68 cooperate to form a "T" shape (FIG. 5) into the engagement surface 54 of each arm 46. While the second channel 68 will be described and shown hereinafter as being formed in each arm 46, only one or more of the arms 46 could include a second channel 68. Further, while the second channel 68 is described as being formed substantially perpendicular to the first channel 60, the second channel 68 could alternatively be positioned at virtually any angle relative to the first channel 60 provided the first channel 60 and the second channel 68 intersect (i.e., are not parallel to one another). One or both of the first channel 60 and the second channel 68 may be formed in the arms 46 by a casting process and may or may not be finished machined before assembly to shell 12.

Figure 7:
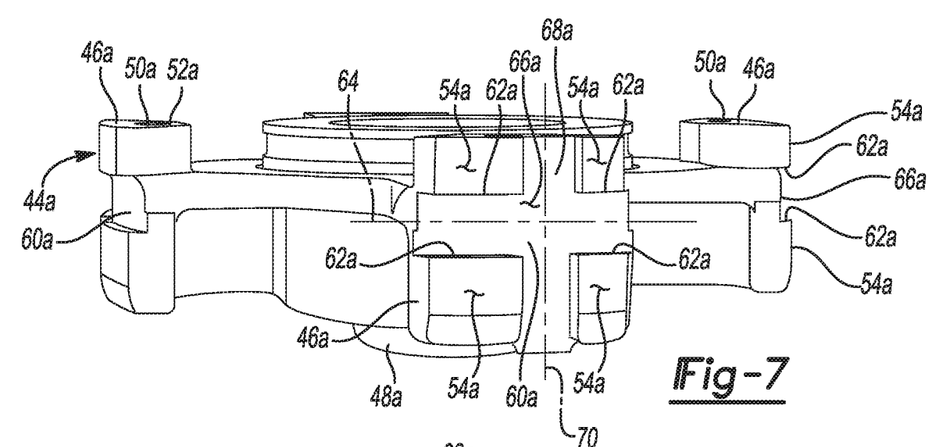
FIG. 7 is a perspective view of an alternate bearing housing that may be used with the compressor of FIG. 1.
Figure 8:
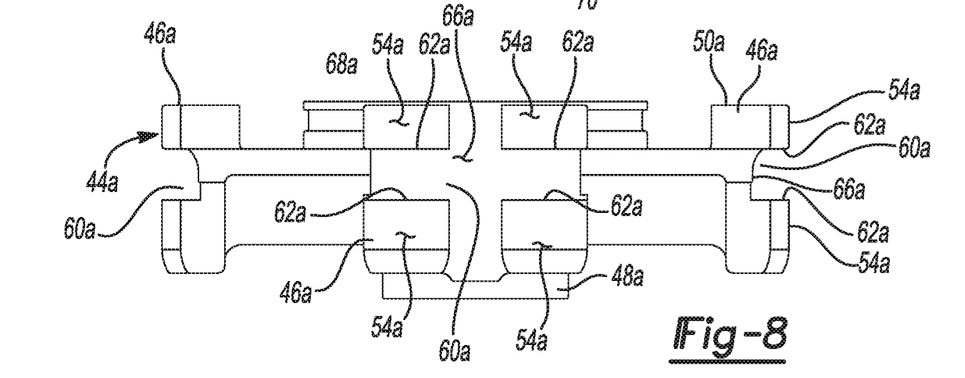
FIG. 8 is a side view of the bearing housing of FIG. 7.
Figure 9:
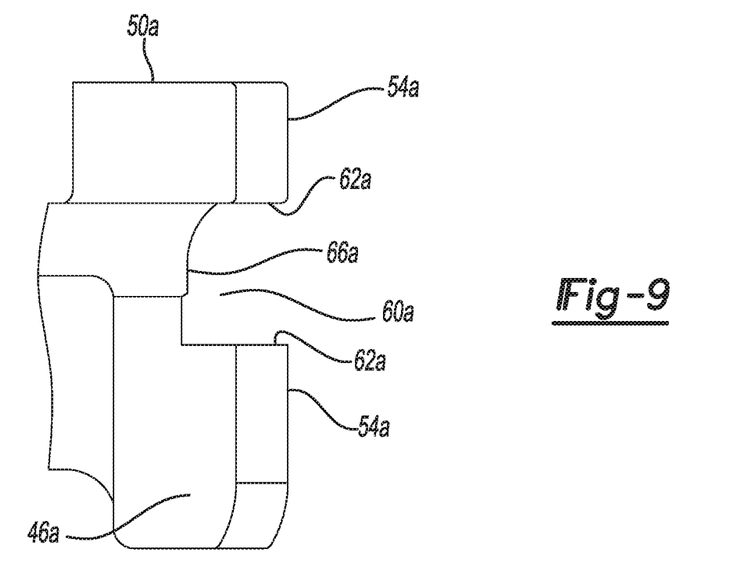
FIG. 9 is a side view of the bearing housing of FIG. 7.

With particular reference to FIGS. 7-9, an alternate bearing housing 44a for use with the compressor 10 will be described in detail. In view of the substantial similarity in structure and function of the components associated with the bearing housing 44 with respect to the bearing housing 44a, like reference numerals are used hereinafter and in the drawings to identify like components while like reference numerals containing letter extensions are used to identify those components that have been modified.

The bearing support 44a may include a series of arms 46a extending from a central hub 48a. As with the bearing housing 44, the bearing housing 44a may include any number of arms 46a. While the bearing housing 44a may include any number of arms 46a, the bearing housing 44a will hereinafter be described and shown as including four (4) arms 46a (FIG. 7).

Each arm 46a may extend from the hub 48a and may include a support surface 50a, an attachment aperture 52a, and an engagement surface 54a. The engagement surface 54a may include a similar—if not identical—radius of curvature as the radius of curvature of the inner surface 34 of the central body 24. Furthermore, the engagement surface 54a may be spaced apart and separated from the inner surface 34 the same distance across substantially the entire engagement surface 54a. Alternatively, the engagement surface 54a may be in contact with the inner surface 34 of the central body 24 across substantially the entire engagement surface 54a.

The support surface 50a may be formed substantially perpendicular to the engagement surface 54a and may include attachment apertures 52a formed therein. As with the attachment apertures 52 of the bearing housing 44, the attachment apertures 52a may receive fasteners 56 to secure a radial position of the non-orbiting scroll member 38 relative to the bearing housing 44a while concurrently permitting axial movement of the non-orbiting scroll member 38 relative to the bearing housing 44a.

The arms 46a may each include a first channel 60a formed into the arms 46a at the engagement surface 54a. The first channel 60a may include a longitudinal axis 64 that is substantially perpendicular to the longitudinal axis 58 of the compressor 10. The first channel 60a may include a pair of edges 62a that extend along a length of the first channel 60a and substantially parallel to the longitudinal axis 64 of the first channel 60a. The longitudinal axis 64a of the first channel 60 may follow a radius of curvature of the first channel 60a and may be formed substantially perpendicular to the longitudinal axis 58 of the shell 12.

The first channel 60a may additionally include an engagement surface 66a having a radius of curvature that is similar or smaller than a radius of curvature of the engagement surface 54a and/or the inner surface 34 of the central body 24. If the engagement surface 66a of the first channel 60a includes the same radius of curvature as the inner surface 34 of the central body 24, the engagement surface 66a may be spaced apart and separated from the inner surface 34 of the central body 24 the same distance along the entire length of the engagement surface 66a.

The arms 46a may additionally include a second channel 68a formed into the arms 46a at the engagement surface 54a. The second channel 68a may include a longitudinal axis 70 that is substantially perpendicular to the longitudinal axis 64 of the first channel 60a and is substantially parallel to the longitudinal axis 58 of the shell 12. The second channel 68a may be in communication with the first channel 60a and may extend through the first channel 60a at a junction of the first channel 60a and the second channel 68a. Cooperation between the first channel 60a and the second channel 68a may provide each arm 46a with a substantially cross or "t" shape (FIG. 8). As with the bearing housing 44, once the bearing housing 44a is inserted into the shell 12, the first channel 60a and the second channel 68a oppose the inner surface 34 of the central body 24. While the second channel 68a is described and shown as being substantially perpendicular to the first channel 60a, the second channel 68a could alternatively be positioned at virtually any angle relative to the first channel 60a provided the first channel 60a and the second channel 68a intersect (i.e., are not parallel to one another). One or both of the first channel 60a and the second channel 68a may be formed in the arms 46a by a casting process and may or may not be finished machined before assembly to shell 12.

Either of the foregoing bearing housings 44, 44a may include features that balance the bearing housing 44, 44a during use to ensure balanced deflection of the bearing housing 44, 44a under loading. While balancing features (FIG. 10) could be incorporated into both of the bearing housings 44, 44a, the balancing features will be shown and described as being incorporated into the bearing housing 44.

Figure 10:
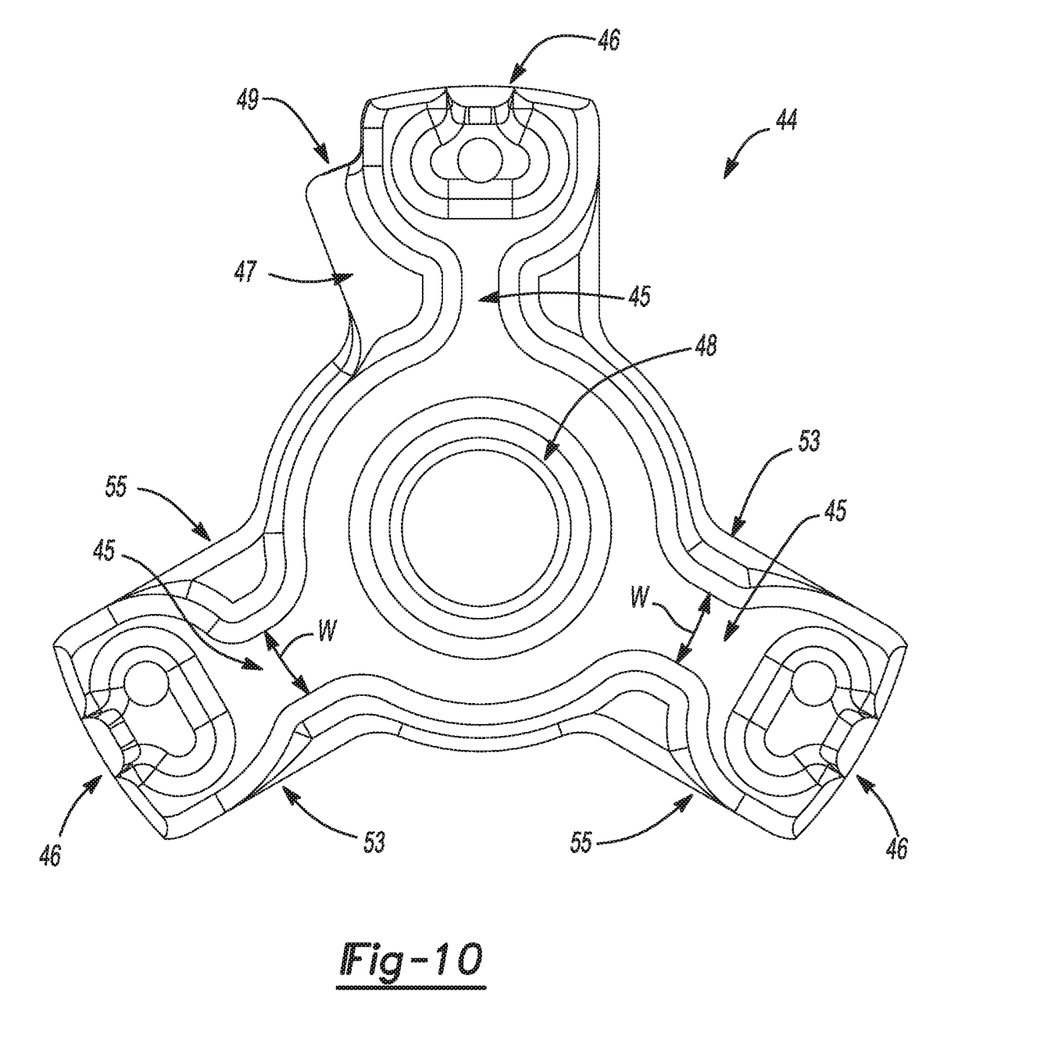
FIG. 10 is a bottom view of the bearing housing of FIG. 7.

With particular reference to FIG. 10, one of the arms 46 of the bearing housing 44 is shown as including a projection 47 having an oil-drain hole 49 in fluid communication with an area of the bearing housing 44 proximate to the hub 48. The oil-drain hole 49 permits oil to drain from the bearing housing 44 to prevent excessive oil from collecting within the bearing housing 44 during use.

The projection 47 may extend from a side of one of the arms 46 and, as a result, may cause the one arm 46 to have a different shape, size, stiffness, and/or weight than the other arms 46. The different shape, size, stiffness, and/or weight of the arm 46 having the projection 47 may result in the bearing housing 44 being unbalanced during use. The other arms 46 may include a balancing feature or features that balance the bearing housing 44 by accounting for the differences of the arm 46 having the projection 47. For example, one or both of support ribs 45 of the arms 46 without the projection 47 may include a larger width (W) than the support rib 45 of the arm 46 having the projection 47. In addition or alternatively, the support ribs 45 of the arms 46 without the projection 47 may be off-set from a central, longitudinal axis of each arm 46. Namely, a central, longitudinal axis of each support rib 45 may be off-set from a central, longitudinal axis of each arm 46 (i.e., each arm 46 without the projection 47) such that the support rib 45 is closer to a first side 53 of the arm 46 than a second side 55 of the arm 46. In one configuration, the central, longitudinal axis of each support rib 45 may be off-set from a central, longitudinal axis of each arm 46 (i.e., each arm 46 without the projection 47) by approximately 3 mm. The foregoing balancing features cooperate to balance the bearing housing 44 to allow the bearing housing 44 to deflect symmetrically when loaded.

While the compressor 10 may incorporate either the bearing housing 44 or the bearing housing 44a, the compressor 10 will be described hereinafter as incorporating the bearing housing 44.

Figure 1:
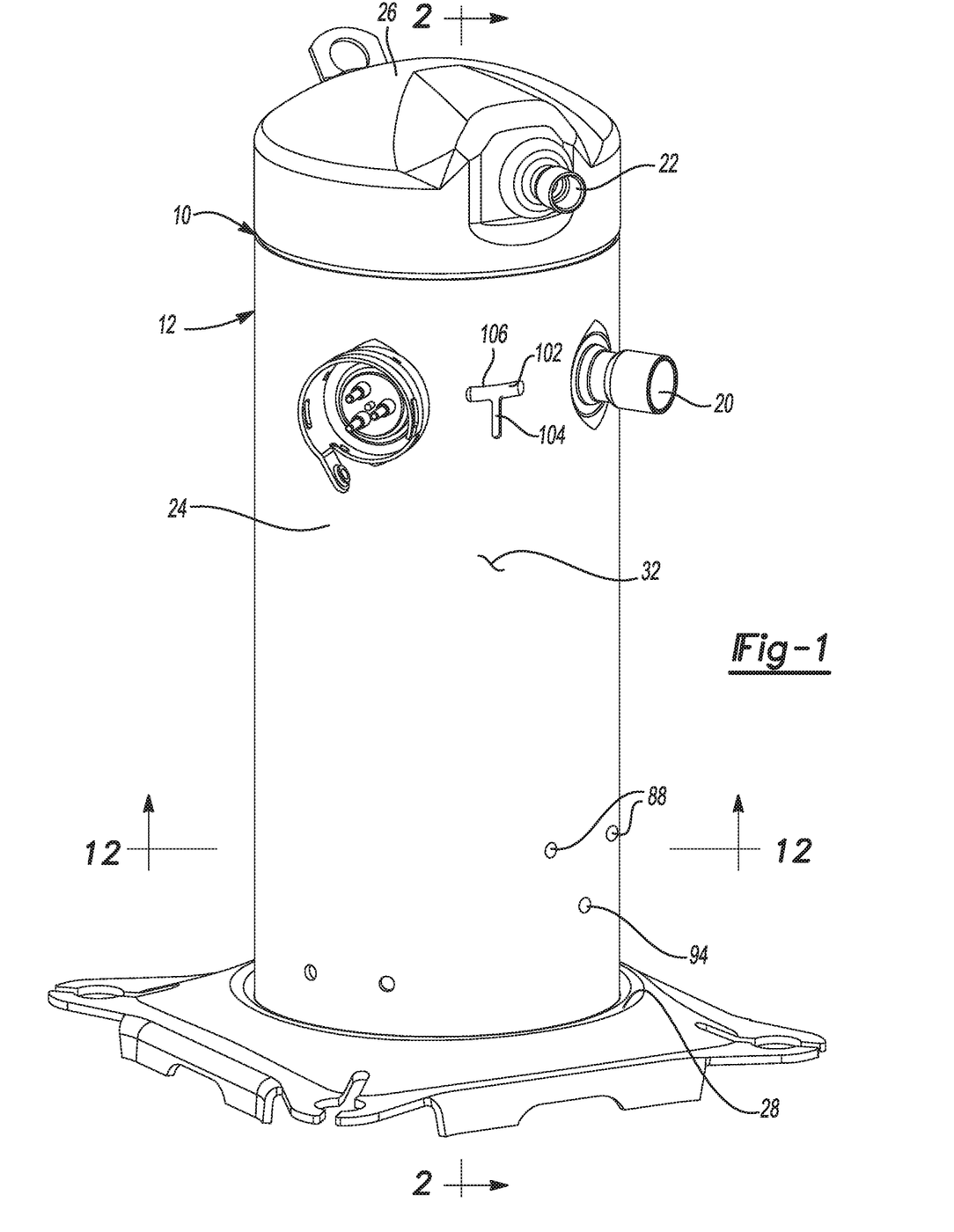
FIG. 1 is a perspective view of a compressor in accordance with the principles of the present disclosure.
Figure 2:
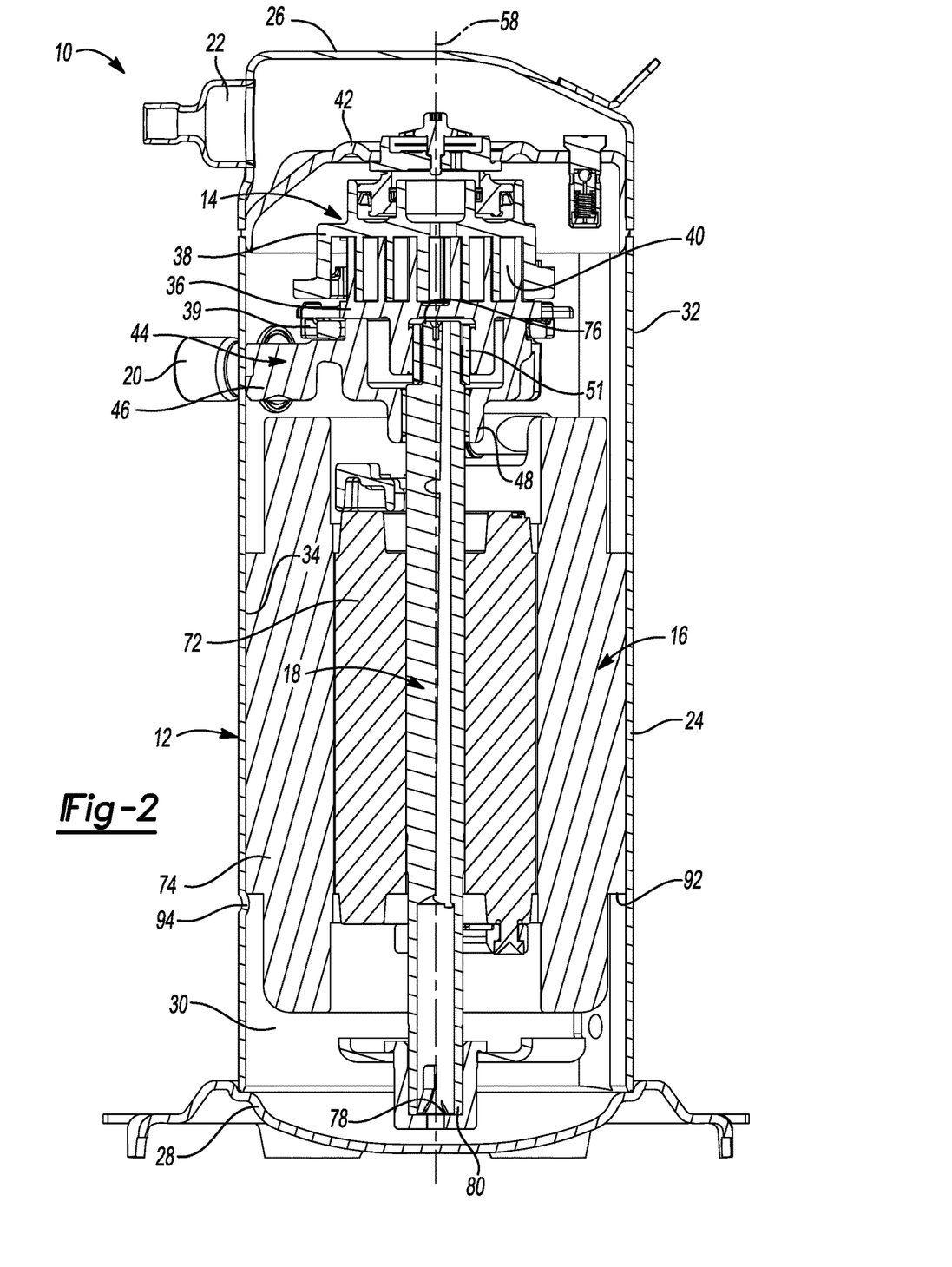
FIG. 2 is a cross-sectional view of the compressor of FIG. 1 taken along line 2-2.
Figure 3:
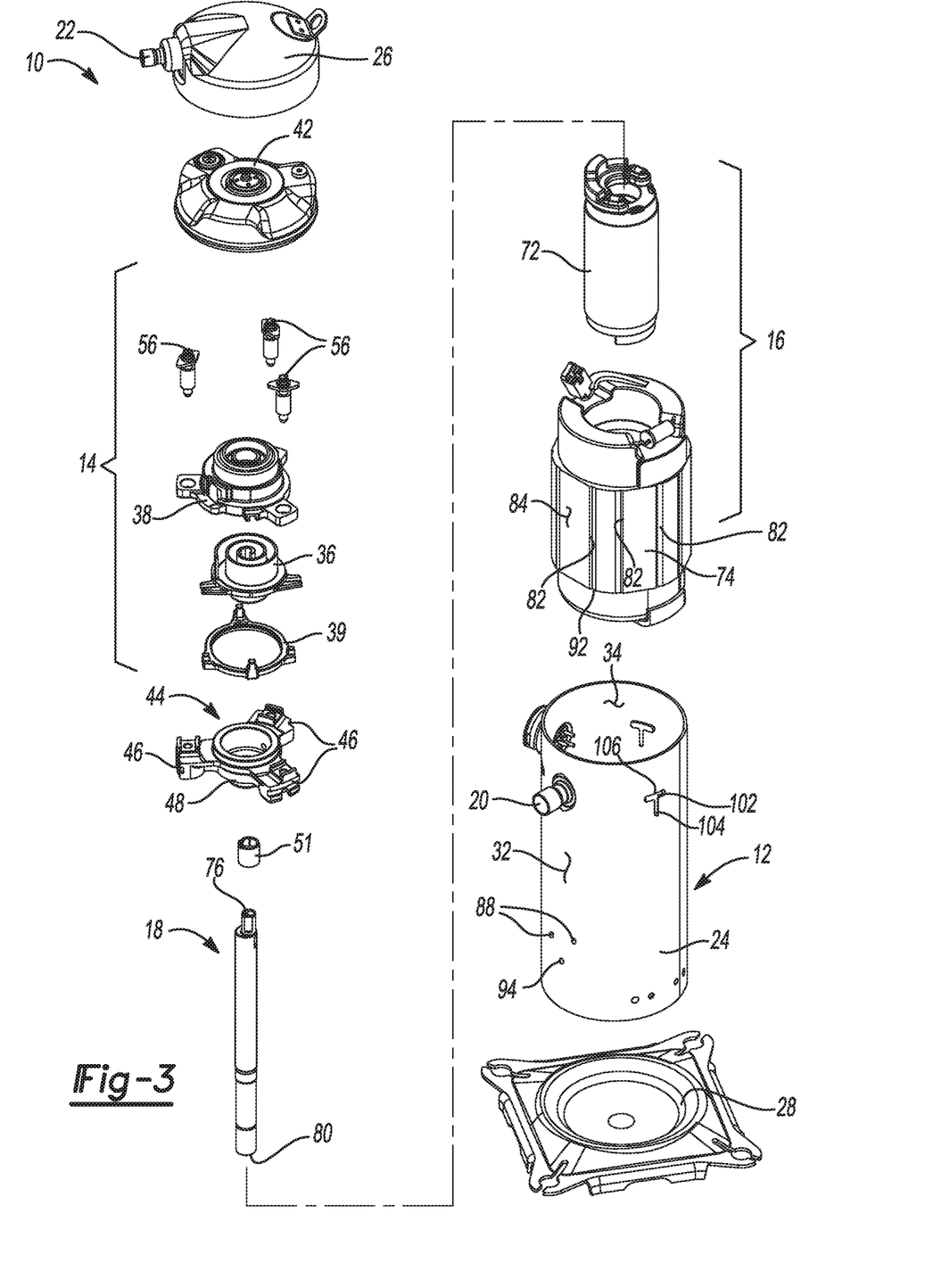
FIG. 3 is a partial exploded view of the compressor of FIG. 1.

With particular reference to FIGS. 2 and 3, the motor 16 is shown as including a rotor 72 fixed for rotation with the drive shaft 18 and a stator 74 fixed to the shell 12. The drive shaft 18 may be rotatably supported within the shell 12 by the bearing housing 44 at the hub 48. Further, the drive shaft 18 may include a first end 76 received within a drive bushing 51 that is engaged with the orbiting scroll member 36 proximate to a first end 76 of the drive shaft 18 and may additionally be rotatably supported within the shell 12 by a lower bearing 78 disposed proximate to a second end 80 of the drive shaft 18.

Rotatably supporting the drive shaft 18 within the shell 12 allows the rotor 72 to apply a rotational force on the drive shaft 18 which, in turn, causes the orbiting scroll member 36 to orbit relative to the non-orbiting scroll member 38 due to interaction between the orbiting scroll member 36 and the Oldham coupling 39. Specifically, the first end 76 of the drive shaft 18 may be received within the orbiting scroll member 36 to allow the drive shaft 18 to apply a rotational force on the orbiting scroll member 36 via the drive bushing 51. The rotational force exerted on the orbiting scroll member 36 causes the orbiting scroll member 36 to orbit relative to the non-orbiting scroll member 38. Such movement of the orbiting scroll member 36 relative to the non-orbiting scroll member 38 compresses fluid within the pockets 40 disposed between the orbiting scroll member 36 and the non-orbiting scroll member 38, thereby elevating a pressure of the fluid received at the suction inlet 20.

Figure 12:
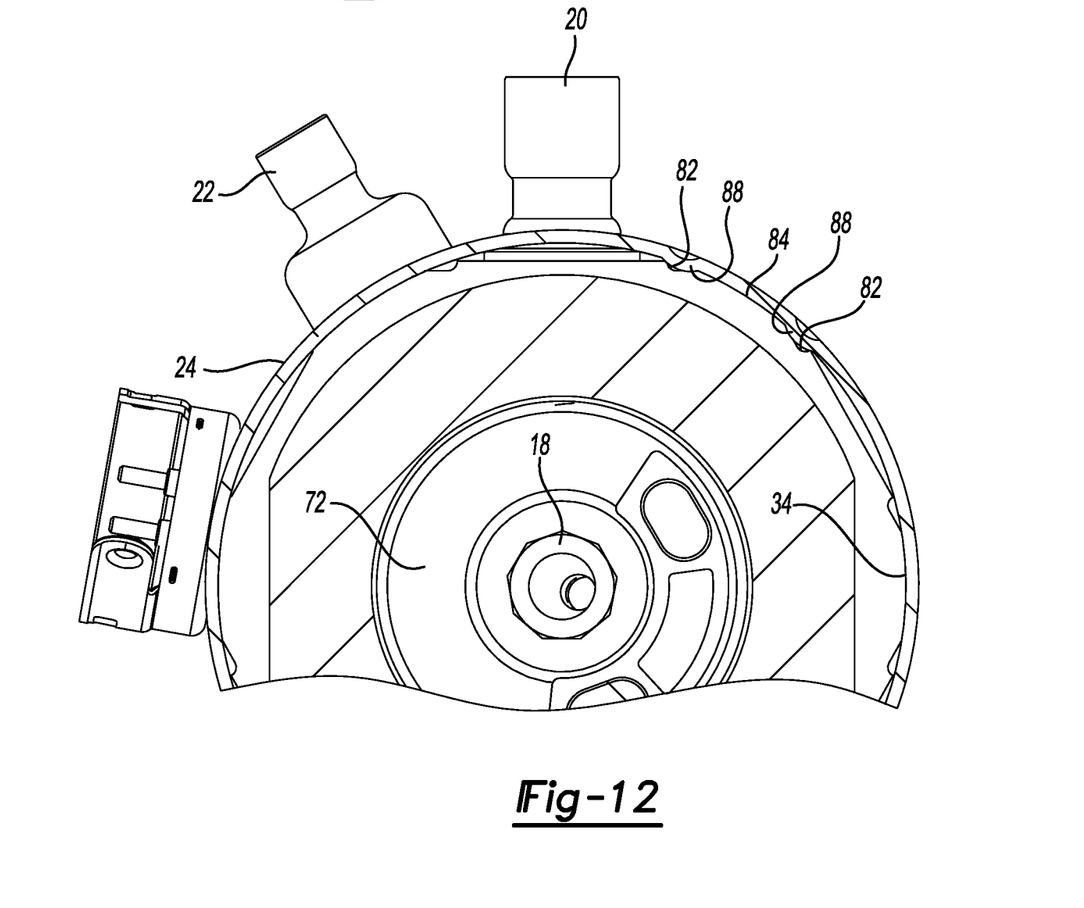
FIG. 12 is a cross-sectional view taken along line 12-12 of FIG. 1 detailing an attachment location of a stator of the compressor of FIG. 1 to a shell of the compressor of FIG. 1.

The stator 74 may be received within the shell 12 and may selectively cause rotation of the rotor 72 and, thus, the drive shaft 18 relative to the shell 12 when current is supplied to the stator 74. The stator 74 may include channels 82 that are formed into an outer surface 84 of the stator 74 and extend in a direction substantially parallel to the longitudinal axis 58 of the shell 12. The channels 82 may be positioned relative to one another such that a portion of the outer surface 84 disposed between adjacent channels 82 opposes and contacts the inner surface 34 of the central body 24 (FIG. 12) when the stator 74 is secured to the inner surface 34 of the shell 12.

With particular reference to FIGS. 1, 4-6, and 11-14, assembly of the bearing housing 44 and stator 74 to the shell 12 will be described in detail. While the stator 74 will be described as being attached to the shell 12 prior to attachment of the bearing housing 44, the bearing housing 44 could alternatively be attached to the shell 12 prior to or concurrently with the stator 74.

The stator 74 may be positioned within the shell 12 at a desired location along the central body 24. Once the stator 74 is positioned relative to the central body 24 along the longitudinal axis 58, the stator 74 may be attached to the shell 12 by deforming a portion of the shell 12 in the area of the stator 74. Specifically, the central body 24 of the shell 12 and the stator 74 may be positioned relative to one another on a fixture (not shown) to maintain the relative position of the central body 24 and the stator 74 prior to and during attachment of the stator 74 to the central body 24.

Once the central body 24 and stator 74 are properly positioned relative to one another, at least one punch 86 may exert a force on the outer surface 32 of the central body 24 to deform the shell 12 in an area of the stator 74. Specifically, the punch 86 may engage the outer surface 32 of the central body 24 to deform a portion of the shell 12 and cause the shell 12 to enter respective channels 82 of the stator 74. The portion of the shell 12 that is deformed and flows into the channels 82 of the stator 74 fixes the radial position of the stator 74 relative to the shell 12, thereby restricting rotational movement of the stator 74 within the shell 12.

The portion of the shell 12 that flows into the channels 82 may completely fill one or more of the channels 82. Alternatively, the channels 82 may only be partially filled by the material of the shell 12. For example, the shell 12 may be deformed near adjacent channels 82 such that material of the shell 12 only flows partially into the adjacent channels 82 and at opposite ends of each channel 82 in a radial direction to restrict relative rotation between the stator 74 and the shell 12. Such a configuration would result in opposing edges of adjacent channels 82 being exposed (i.e., free from material of the shell 12 following deformation thereof).

Figure 13:
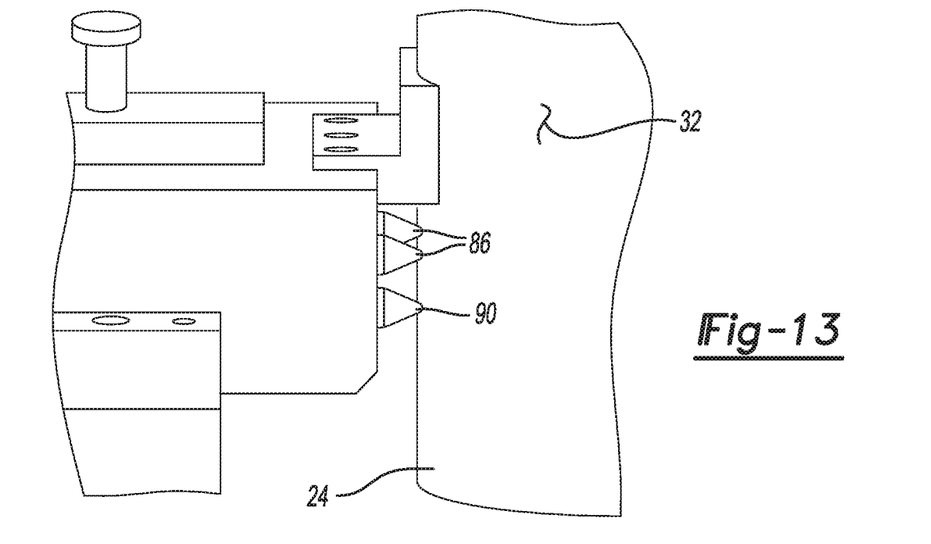
FIG. 13 is a perspective view of a punch for use in attaching a stator of the compressor of FIG. 1 to a shell of the compressor of FIG. 1.
Figure 14:
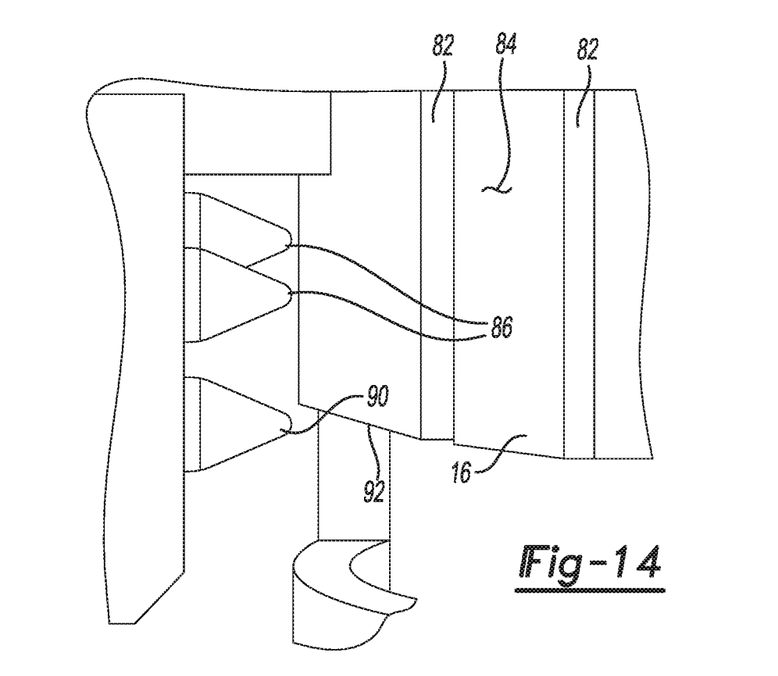
FIG. 14 is a perspective view of the punch of FIG. 13 shown in conjunction with a stator of the compressor of FIG. 1 with a shell of the compressor removed to show the relative position of the punch and the stator.

Once the shell 12 is deformed, the punch 86 may be retracted and the outer surface 32 of the shell 12 is deformed in the area of the punch 86 such that a pair of depressions 88 (FIGS. 1 and 3) remain in the outer surface 32 of the shell 12. With reference to FIG. 13, in one configuration, the punch 86 may include a pair of punches 86. While the channels 82 are described and shown as extending along a length of the stator 74, the channels 82 could, alternatively, be localized depressions that only partially extend along a length of the stator 74. As such, the depressions formed by the punches 86 could be used to restrict both rotational and axial movement of the stator 74 relative to the shell 12.

An additional punch 90 may be used to deform a portion of the shell 12 in an area below a lower edge 92 (FIGS. 2 and 14) of the stator 74 to restrict movement of the stator 74 in an axial direction substantially parallel to the longitudinal axis 58 of the shell 12. The punch 90 may engage the outer surface 32 of the shell 12 in an area adjacent to and below the lower edge 92 of the stator 74 to cause the material of the shell 12 to flow into the inner volume 30 and contact the lower edge 92 of the stator 74. Contact between the material of the shell 12 and the lower edge 92 of the stator 74 restricts movement of the stator 74 in an axial direction parallel to the longitudinal axis 58. The punch 90 may be retracted once the shell 12 is sufficiently deformed and may leave a depression 94 at the outer surface 32 of the central body 24.

The punch 90 may engage the outer surface 32 following engagement of the punch 86 and the outer surface 32. Alternatively, the punch 90 may engage the outer surface 32 prior to engagement of the punches 86. While the punches 86, 90 may engage the outer surface 32 of the central body 24 at different times, the punches 86, 90 may be used concurrently to deform the shell 12 at the same time, thereby creating depressions 88, 94 and fixing a rotational and axial position of the stator 74 within the central body 24 concurrently.

The bearing housing 44 may likewise be attached to the central shell 12 by deforming the outer surface 32 of the central body 24 in an area of the engagement surfaces 54 of each arm 46. Specifically, the bearing housing 44 may be positioned along the longitudinal axis 58 at a desired location within the central body 24. The position of the bearing housing 44 may be maintained via a fixture (not shown) that temporarily fixes a position of the bearing housing 44 relative to the central body 24. A punch 96 (FIG. 11) may be used to deform the shell 12 in an area of each arm 46 while the bearing housing 44 is held in position relative to the central body 24 by the fixture.

Figure 11:
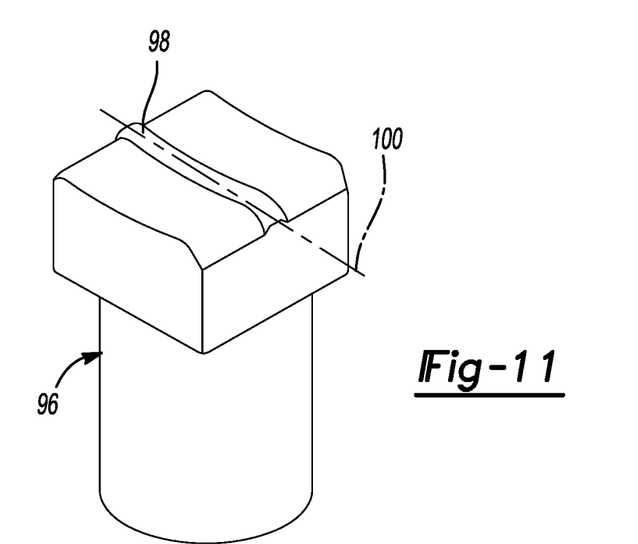
FIG. 11 is a perspective view of a punch for use during manufacturing of the compressor of FIG. 1.

The punch 96 may include a projection 98 having a longitudinal axis 100 that is substantially parallel to the longitudinal axis 64 of the first channel 60. The punch 96 may be positioned relative to the outer surface 32 of the central body 24 such that the projection 98 is aligned with the first channel 60 to allow the punch 96 to deform the shell 12 into the first channel 60. In one configuration, individual punches 96 may be positioned relative to individual first channels 60 of respective arms 46 such that the projection 98 is aligned with the first channel 60 of each arm 46 to simultaneously deform the shell 12 at three locations into the respective first channels 60. While the punch 96 is shown as including a projection 98 having a similar shape as that of the first channel 60, the punch 96 could alternatively include a complex shape that approximates the shape of the combined first channel 60 and second channel 68. In other words, the punch 96 could include a substantially "T" shape that approximates the "T" shape of the first channel 60 and the second channel 68.

Deforming the shell 12 into the first channel 60 of each arm 46 results in a groove 102 (FIG. 1) being formed in the outer surface 32 of the central body 24. The groove 102 may include a longitudinal axis that is substantially parallel to the longitudinal axis 64 of the first channel 60, as the overall shape of the groove 102 is defined by a portion of the inner surface 34 of the central body 24 contacting the first channel 60 and flowing into the first channel 60 under force of the punch 96. Specifically, the punch 96 may apply a force to the outer surface 32 via the projection 98, thereby causing the material of the central body 24 to engage the edges 62 of the first channel 60 and flow into the first channel 60. Therefore, the edges 62—in cooperation with the overall shape of the first channel 60—define the overall shape of the groove 102.

As described above, the second channel 68 may be in communication with the first channel 60. Therefore, when the punch 96 exerts a force on the outer surface 32 of the central body 24, material from the central body 24 likewise "flows" or deforms into the second channel 68. Causing the material of the central body 24 to flow into the second channel 68 likewise results in a groove 104 (FIG. 1) being formed in the outer surface 32. Because the groove 104 includes a shape similar to the second channel 68 and, further, because the second channel 68 is in communication with the first channel 60, the resulting groove 104 is in communication with the groove 102 to provide the outer surface 32 with a substantially T-shaped depression 106.

The groove 102 may be formed substantially perpendicular to the longitudinal axis 58 of the shell 12 to prevent movement of the bearing housing 44 in a direction substantially parallel to the longitudinal axis 58. Likewise, because the groove 104 may include a longitudinal axis that is formed substantially parallel to the longitudinal axis 58 of the shell 12, the groove 104 may prevent rotation of the bearing housing 44 relative to the central body 24. In short, causing the material of the central body 24 to flow in opposite directions (i.e., parallel to and perpendicular to the longitudinal axis 58 of the shell 12) fixes the axial and radial position of the bearing housing 44 within the central body 24.

The punch 96 may simultaneously form the groove 102 and the groove 104, thereby forming the T-shaped depression 106. Namely, when the projection 98 of the punch 96 engages the outer surface 32 of the central body 24, the material of the central body 24 flows into the first channel 60 and simultaneously flows into the second channel 68 due to the second channel 68 being in communication with the first channel 60. As such, the punch 96 is able to simultaneously cause material to flow in opposite directions without requiring a secondary punch.

Once the remaining components of the compressor 10 are installed within the shell 12 and the top cap 26 and bottom cap 28 are secured to the central body 24, the compressor 10 may be used to generate discharge-pressure fluid. Namely, current may be selectively supplied to the motor 16 to cause rotation of the rotor 72 and, thus, the drive shaft 18, relative to the stator 74. Rotation of the drive shaft 18 causes the orbiting scroll member 36 to orbit relative to the non-orbiting scroll member 38, which draws suction-pressure fluid into the inner volume 30 at the suction inlet 20. The suction-pressure fluid is received within the pockets 40 and is compressed between the orbiting scroll member 36 and the non-orbiting scroll member 38 prior to being discharged from the inner volume 30 via the muffler plate 42 and discharge port 22.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A compressor comprising:
a shell having an inner surface and an outer surface;
a stator attached to said shell at said inner surface via a first stake, said first stake formed by deforming a first portion of said shell into said stator;
a second stake formed by deforming a second portion of said shell into said stator; and
a third stake formed by deforming a third portion of said shell into contact with an edge portion of said stator to fix an axial position of said stator along a longitudinal axis of said shell,
wherein said second stake is circumferentially offset from said first stake, and
wherein said third stake and said edge portion of said stator are offset from said first and second stakes in a direction parallel to said longitudinal axis of said shell.

2. The compressor of claim 1, wherein said stator includes a first recess receiving said deformed first portion of said shell.

3. The compressor of claim 1, wherein said stator includes a channel receiving said deformed first portion of said shell.

4. The compressor of claim 3, wherein said channel is formed into an outer surface of said stator and extends along a length of said stator.

5. The compressor of claim 3, wherein said channel extends in a direction substantially parallel to a longitudinal axis of said stator.

6. The compressor of claim 1, wherein a portion of said stator contacts said inner surface of said shell between said first stake and said second stake.

7. The compressor of claim 1, wherein said first stake and said second stake are disposed in the same plane, said plane formed substantially perpendicular to said longitudinal axis of said shell.

8. The compressor of claim 7, wherein said third stake is disposed vertically below said plane in which said first and second stakes are disposed.

9. The compressor of claim 1, further comprising a bearing housing disposed within said shell and including an engagement surface opposing said inner surface of said shell, said engagement surface including a first channel and a second channel in communication with said first channel, said first channel and said second channel receiving a deformed portion of said shell therein to fix a position of said bearing housing relative to said shell.

10. A compressor comprising:
a shell having an inner surface and an outer surface;
a stator attached to said shell at said inner surface via a first stake, said first stake formed by deforming a portion of said shell into said stator; and
a bearing housing disposed within said shell and including an engagement surface opposing said inner surface of said shell, said engagement surface including a first channel and a second channel in communication with said first channel, said first channel and said second channel receiving a deformed portion of said shell therein to fix a position of said bearing housing relative to said shell.

11. The compressor of claim 10, wherein said first channel extends further in a first direction than in a second direction such that a longitudinal axis of said first channel extends in said first direction without intersecting a longitudinal axis of said shell, wherein said second channel extends from said first channel in said second direction, wherein said first direction is substantially perpendicular to said longitudinal axis of said shell, wherein said second direction is substantially parallel to said longitudinal axis of said shell, and wherein a maximum span of said first channel in said first direction is greater than a maximum span of said second channel in said first direction.

12. The compressor of claim 10, wherein said bearing housing includes at least two arms extending from a hub, and wherein said first channel and said second channel are formed into a distal end of said at least two arms.

13. A compressor comprising:
a shell having an inner surface and an outer surface;
a stator attached to said shell at said inner surface via a first stake, said first stake formed by deforming a portion of said shell into said stator; and
a bearing housing disposed within said shell and including an engagement surface opposing said inner surface, said engagement surface including a first channel and a second channel in communication with said first channel, said first channel extending further in a circumferential direction than in an axial direction, said second channel extends from said first channel in said axial direction, said first channel and said second channel receiving a deformed portion of said shell therein to fix a position of said bearing housing relative to said shell, wherein a maximum span of said first channel in said circumferential direction is greater than a maximum span of said second channel in said circumferential direction, wherein said circumferential direction extends around a longitudinal axis of said shell, and wherein said axial direction extends parallel to said longitudinal axis of said shell.

14. The compressor of claim 13, wherein said stator includes a first recess receiving said deformed portion of said shell.

15. The compressor of claim 13, wherein said stator includes a channel receiving said deformed portion of said shell.

16. The compressor of claim 15, wherein said channel is formed into an outer surface of said stator and extends along a length of said stator, wherein said channel extends in a direction substantially parallel to a longitudinal axis of said stator.

17. The compressor of claim 13, further comprising a second stake, said second stake formed by deforming a portion of said shell into said stator.

18. The compressor of claim 17, wherein a portion of said stator contacts said inner surface of said shell between said first stake and said second stake.

19. The compressor of claim 17, further comprising a third stake, said third stake formed by deforming a portion of said shell into contact with an edge portion of said stator to fix an axial position of said stator along a longitudinal axis of said shell.

20. The compressor of claim 17, wherein said first stake and said second stake are disposed in the same plane, said plane formed substantially perpendicular to a longitudinal axis of said shell.

* * * * *